(12) United States Patent
Yang

(10) Patent No.: US 10,513,276 B2
(45) Date of Patent: Dec. 24, 2019

(54) POSITIONING GUIDANCE SYSTEM AND METHOD BASED ON GUIDE RAILS

(71) Applicant: Guoqiang Yang, Changsha (CN)

(72) Inventor: Guoqiang Yang, Changsha (CN)

( * ) Notice: Subject to any disclaimer, the term of this patent is extended or adjusted under 35 U.S.C. 154(b) by 571 days.

(21) Appl. No.: 15/344,519

(22) Filed: Nov. 6, 2016

(65) Prior Publication Data

US 2018/0127005 A1 May 10, 2018

(51) Int. Cl.
| | | |
|---|---|---|
| *B61L 3/16* | (2006.01) | |
| *B61L 3/00* | (2006.01) | |
| *B61L 25/02* | (2006.01) | |
| *B61L 27/00* | (2006.01) | |
| *B61L 27/04* | (2006.01) | |
| *H04B 1/02* | (2006.01) | |
| *H04B 1/06* | (2006.01) | |

(52) U.S. Cl.
CPC .............. *B61L 3/16* (2013.01); *B61L 3/006* (2013.01); *B61L 3/008* (2013.01); *B61L 25/025* (2013.01); *B61L 27/0038* (2013.01); *B61L 27/0077* (2013.01); *B61L 27/04* (2013.01); *B61L 2201/00* (2013.01); *B61L 2205/00* (2013.01); *H04B 1/02* (2013.01); *H04B 1/06* (2013.01)

(58) Field of Classification Search
CPC .. B61L 3/16; B61L 3/006; B61L 3/008; B61L 3/065; B61L 3/125; B61L 25/025; B61L 27/0038; B61L 27/0077; B61L 27/04; B61L 2201/00; B61L 2205/00; H04B 1/02; H04B 1/06; B23Q 97/14; B65G 2203/02; B65G 2203/0233
See application file for complete search history.

(56) References Cited

U.S. PATENT DOCUMENTS

| | | | |
|---|---|---|---|
| 2008/0196631 A1* | 8/2008 | Kosmowski | B23K 26/02 108/20 |
| 2012/0153089 A1* | 6/2012 | Galm | B61L 3/125 246/122 R |
| 2012/0189410 A1* | 7/2012 | Toebes | B65G 1/0492 414/273 |
| 2017/0344009 A1* | 11/2017 | Wernersbach | G05D 1/0011 |
| 2019/0056247 A1* | 2/2019 | Erlich | H02K 41/02 |
| 2019/0067508 A1* | 2/2019 | Spotti | H01L 31/18 |
| 2019/0173574 A1* | 6/2019 | Georgeson | H04B 7/2656 |

* cited by examiner

*Primary Examiner* — Sze-Hon Kong
(74) *Attorney, Agent, or Firm* — Im IP Law; C. Andrew Im; Chai Im

(57) ABSTRACT

A positioning guidance system and method based on guide rails, comprising: a host computer; a guide rail band; a plurality of beacons arranged along the guide rail band; and a receiver array fixedly mounted on a target to be positioned and guided, wherein: the host computer is connected to the guide rail band and the beacons; the beacons are connected to the receiver array; the host computer transmits movement requirements and a list and sequence of beacons to be passed to the receiver array through the beacons; the guide rail band transmits a positioning guidance signal to the receiver array; and the receiver array determines a relative position of the target to be positioned and guided by taking the guide rail band as reference, according to a projection of the guide rail band on the receiver array.

20 Claims, 4 Drawing Sheets

POSITIONING GUIDANCE SYSTEM AND METHOD BASED ON GUIDE RAILS

FIELD OF THE INVENTION

The present invention relates to the field of automatic control. More particularly, this invention describes a positioning guidance system and method based on guide rails.

BACKGROUND OF THE INVENTION

Existing positioning guidance modes based on guide rails include an electromagnetic rail mode, a metal rail model and a visual guidance mode. In the electromagnetic rail mode, a driving route is provided by using electromagnetic rails laid on the ground, and a target to be positioned and guided is guided according to information about the electromagnetic rails detected by a sensor arranged thereon. The electromagnetic guidance has the following advantages: guidance lines are hidden and less likely to be polluted and damaged; the guidance principle is simple and reliable; it is convenient for communication and control; the sound and light are not interfered; and the manufacture cost is low. However, its disadvantages are as follows: the path is difficult to be altered and expanded; it is difficult to adapt to a complicated path; the long-time use of the sensor will result in problems such as temperature excursion and magnetic saturation; and, in some application scenarios, the degree of finish is highly required, and the laid magnetic strips affect the appearance and are difficult to be managed.

In the metal rail guidance mode, the driving route is provided by metal rails laid on the ground or overhead, and a target to be positioned and guided is driven completely according to the constraint of the metal rails. This rail guidance mode has the following advantages: the positioning of working stations is simple and accurate. However, its disadvantages are as follows: the rails need to be re-laid when a transportation path is changed so that it is time-consuming and labor-consuming; the flexibility for path modification is poor; this rail guidance mode is suitable for a production mode with a fixed path; and the position and direction of the rails at a working state relative to the operation equipment are highly required.

The visual guidance is based on optical signals. The positioning guidance to a target to be positioned and guided is realized by processing color zone signals collected by a camera or a visual sensor. This visual guidance mode has the advantages of fast response speed, being free of electromagnetic interference and environmental influences, and high adaptability. However, its disadvantages are as follows: the pollution wear and accident damage of the outside complicated environment to color zone rails or guidance rails will reduce the reliability of guidance, or even the positioning guidance cannot be operated normally.

OBJECTS AND SUMMARY OF THE INVENTION

To solve the problem of poor expansibility of the existing positioning guidance modes based on guide rails, the present invention provides a positioning guidance system based on guide rails, including a host computer, a guide rail band, a plurality of beacons arranged along the guide rail band, and a receiver array fixedly mounted on a target to be positioned and guided;

the host computer is in communication connection to the guide rail band and the beacons, and the beacons are in wireless communication connection to the receiver array;

the receiver array is formed by a plurality of receivers in an array form;

the host computer transmits movement requirements and a list and sequence of beacons to be passed to the receiver array through the beacons;

the guide rail band is configured to transmit a positioning guidance signal to the receiver array; the receiver array is configured to determine a projection of the guide rail band on the receiver array according to the positioning guidance signal, and compare the projection with a receiver array positioning reference of the receiver array and then determine a relative position of the target to be positioned and guided by taking the guide rail band as reference according to a result of the comparison; and, the receiver array is further configured to compare beacons that have been passed actually by the target to be positioned and guided and their sequence with the list and sequence of beacons to be passed, and then determine a relative movement direction of the target to be positioned and guided by taking the beacons as reference according to a result of the comparison.

Optionally, the positioning guidance signal transmitted by the guide rail band is an optical wave, an electromagnetic wave or an ultrasonic wave.

Optionally, the positioning guidance signal transmitted by the guide rail band is a modulated signal.

Optionally, when the target to be positioned and guided is moved along the guide rail band in a single direction, the movement requirements and the list and sequence of beacons to the passed transmitted to the receiver array by the host computer specifically include: an identification number of a beacon, an identification number of a next beacon, a distance of the next beacon, a stop allowance of the next beacon, an angle of turn and a maximum permissible speed; and when the target to be positioned and guided is moved along the guide rail band in both directions, the movement requirements and the list and sequence of beacons to the passed transmitted to the receiver array by the host computer specifically include: an identification number of a beacon, an identification number of a previous beacon, a distance of the previous beacon, a stop allowance of the previous beacon, an identification number of a next beacon, a distance of the next beacon, a stop allowance of the next beacon, an angle of uplink turn, an angle of downlink turn, a maximum uplink permissible speed and a maximum downlink permissible speed, wherein the uplink refers to the sequence of beacons that have been passed actually is the same as the set sequence of beacons to be passed, while the downlink has a reverse sequence.

The positioning guidance system based on guide rails provided by the present invention has the following advantages: compared with the electromagnetic guide rail mode and the metal guide rail mode, the guide rail band in the present invention is easy to lay, the guide rail path is easy to be altered and expanded and the environmental adaptability is high; compared with the visual navigation mode, the positioning guidance in the present invention are ensured by both the guide rail band and the beacons, the host computer may change the path of the target to be positioned and guided in real time, the expansibility is relatively high, and the positioning guidance can also be operated normally even if a part of the guide rail band or the beacons is damaged. The positioning guidance system based on guide rails provided by the present invention is particularly suitable for autonomous navigation apparatuses having a relatively fixed movement path.

The present invention further provides a positioning guidance system based on guide rails, including a host computer, a guide rail band, a plurality of beacons arranged along the guide rail band, and a transmitter/receiver array fixedly mounted on a target to be positioned and guided;

the host computer is in communication connection to the guide rail band and the beacons, and the beacons are in wireless communication connection to the transmitter/receiver array;

the transmitter/receiver array is formed by a plurality of transmitters and a plurality of receivers in an array form;

the host computer transmits movement requirements and a list and sequence of beacons to be passed to the transmitter/receiver array through the beacons;

the transmitters/receivers are configured to transmit positioning guidance signals to the guide rail band; the guide rail band is configured to reflect the positioning guidance signals transmitted by the transmitters/receivers to the reflection receivers; the reflection receivers are further configured to determine a projection of the guide rail band on the transmitter/receiver array according to the reflected positioning guidance signals, and compare the projection with a transmitter/receiver array positioning reference of the transmitter/receiver array and then determine relative positions of the transmitters/receivers by taking the guide rail band as reference according to a result of the comparison; and, the transmitter/receiver array is further configured to compare beacons that have been passed actually by the target to be positioned and guided and their sequence with the list and sequence of beacons to be passed, and determine a relative movement direction of the target to be positioned and guided by taking the beacons as reference according to a result of the comparison.

Optionally, the positioning guidance signals transmitted by the transmitter/receiver array are optical waves, electromagnetic waves or ultrasonic waves.

Optionally, the positioning guidance signals transmitted by the transmitter/receiver array are modulated signal.

Optionally, when the target to be positioned and guided is moved in a single direction, the movement requirements and the list and sequence of beacons to the passed transmitted to the transmitter/receiver array by the host computer specifically include: an identification number of a beacon, an identification number of the next beacon, a distance, a stop allowance, an angle of turn and a maximum permissible speed; and when the target to be positioned and guided is moved along the guide rail band in both directions, the movement requirements and the list and sequence of beacons to the passed transmitted to the transmitter/receiver array by the host computer specifically include: an identification number of a beacon, an identification number of a previous beacon, a distance of the previous beacon, a stop allowance of the previous beacon, an identification number of a next beacon, a distance of the next beacon, a stop allowance of the next beacon, an angle of uplink turn, an angle of downlink turn, a maximum uplink permissible speed and a maximum downlink permissible speed, wherein the uplink refers to the sequence of beacons that have been passed actually is the same as the set sequence of beacons to be passed, while the downlink has a reverse sequence.

The positioning guidance system based on guide rails provided by the present invention has the following advantages: compared with the electromagnetic guide rail mode and the metal guide rail mode, the guide rail band in the present invention is easy to lay, the guide rail path is easy to be altered and expanded and the environmental adaptability is high; compared with the visual navigation mode, the positioning guidance in the present invention are ensured by both the guide rail band and the beacons, the host computer may change the path of the target to be positioned and guided in real time, the expansibility is relatively high, and the positioning guidance can also be operated normally even if a part of the guide rail band or the beacons is damaged. The positioning guidance system based on guide rails provided by the present invention is particularly suitable for autonomous navigation apparatuses having a relatively fixed movement path.

The present invention further provides a positioning guidance method based on guide rails, including the following steps of:

transmitting, by a host computer through beacons, movement requirements and a list and sequence of beacons to be passed to a receiver array fixedly mounted on a target to be positioned and guided;

transmitting, by a guide rail band, a positioning guidance signal to the receiver array;

determining a projection of the guide rail band on the receiver array according to differences in intensity between the signals received by receivers at different positions, after the receiver array has received the positioning guidance signal;

comparing, by the receiver array, the projection with a receiver array positioning reference of the receiver array, and determining a relative position of the target to be positioned and guided by taking the guide rail band as reference according to a result of the comparison;

comparing, by the receiver array, beacons that have been passed actually by the target to be positioned and guided and their sequence with the list and sequence of beacons to be passed, and determining a relative movement direction of the target to be positioned and guided by taking the beacons as reference according to a result of the comparison; and inputting, by the receiver array, the relative position, the relative movement direction and the movement requirements into a drive control system of the target to be positioned and guided, to drive the target to be positioned and guided to move according to the relative position, the relative movement direction and the movement requirements through the drive control system, so as to overlap the receiver array positioning reference with the projection and make a movement direction, an angle of turn, a maximum speed and a stop position of the target to be positioned and guided meet the movement requirements transmitted by the host computer, so that the purpose of moving the target to be positioned and guided in a path and direction specified by the host computer and stopping it at a set position is realized.

Optionally, the movement requirements include: a stop position, an angle of turn, a maximum permissible speed, its own orientation, a speed and a tilt angle of the target to be positioned and guided, required by the host computer.

Optionally, the positioning guidance method based on guide rails further includes the following steps of:

uploading, by the receiver array, its own identification number, an identification number of the previously passed beacon, state information of the target to be positioned and guided and passing path information to the host computer through the beacons; and determining, by the host computer, a current position, a state and passing path information of the target to be positioned and guided according to the own identification number, the identification number of the previously passed beacon, the state information of the target to be positioned and guided and the passing path information.

Optionally, there is only one target to be positioned and guided in a path between two adjacent beacons.

Optionally, the movement requirements transmitted to the receiver array by the host computer are updated in real time.

In the positioning guidance method based on guide rails provided by the present invention, the positioning guidance is realized by comparing the projection of the guide rail band with the receiver array positioning reference and communicating the beacons, the transmitter/receiver device is simple, and the adaptability to a complicated environment is high. The beneficial effects of the present invention are as follows: the hardware construction is simple, and the complicated hardware equipment and complicated algorithms of the guide rails and the beacons, the deployment difficulty of the guide rails, and the complicated hardware equipment of the transmitter/receiver device are avoided; the present invention inherits the advantages of the existing guide rail positioning guidance methods but avoids their advantages, so that the present invention has a good practicability, a low system cost and a promising application prospect and is suitable for various indoor and outdoor scenarios. The positioning guidance method based on guide rails provided by the present invention is particularly suitable for autonomous navigation apparatuses having a relatively fixed movement path.

The present invention further provides a positioning guidance method based on guide rails, including the following steps of:

transmitting, by a host computer through beacons, movement requirements and a list and sequence of beacons to be passed to a transmitter/receiver array fixedly mounted on a target to be positioned and guided;

transmitting, by the transmitter/receiver array, positioning guidance signals to the guide rail band, and reflecting, by the guide rail band, the positioning guidance signals transmitted by the transmitter/receiver array to the transmitter/receiver array;

determining a projection of the guide rail band on the transmitter/receiver array according to differences in intensity between the signals received by receivers at different positions, after the transmitter/receiver array has received the positioning guidance signals;

comparing, by the transmitter/receiver array, the projection with a transmitter/receiver array positioning reference of the transmitter/receiver array, and determining relative positions of the transmitters/receivers by taking the guide rail band as reference according to a result of the comparison;

comparing, by the transmitter/receiver array, beacons that have been passed actually by the target to be positioned and guided and their sequence with the list and sequence of beacons to be passed, and determining a relative movement direction of the target to be positioned and guided by taking the beacons as reference according to a result of the comparison; and inputting, by the transmitter/receiver array, the relative position, the relative movement direction and the movement requirements into a drive control system of the target to be positioned and guided, to drive the target to be positioned and guided to move according to the relative position, the relative movement direction and the movement requirements through the drive control system, so as to overlap the transmitter/receiver array positioning reference with the projection and make a movement direction, an angle of turn, a maximum speed and a stop position of the target to be positioned and guided meet the movement requirements transmitted by the host computer, so that the purpose of moving the target to be positioned and guided in a path and direction specified by the host computer and stopping it at a set position is realized.

Optionally, the movement requirements include: a stop position, an angle of turn, a maximum permissible speed, its own orientation, a speed and a tilt angle of the target to be positioned and guided, required by the host computer.

Optionally, the positioning guidance method based on guide rails further includes the following steps of:

uploading, by the transmitter/receiver array, its own identification number, an identification number of the previously passed beacon, state information of the target to be positioned and guided and passing path information; and determining, by the host computer, a current position, a state and passing path information of the target to be positioned and guided according to the own identification number, the identification number of the previously passed beacon, the state information of the target to be positioned and guided and the passing path information.

Optionally, there is only one target to be positioned and guided in a path between two adjacent beacons.

Optionally, all transmitters in the transmitter/receiver array transmit the same positioning guidance signals in a set sequence.

Optionally, all transmitters in the transmitter/receiver array transmit positioning guidance signals simultaneously, and the signal transmitted by each of the transmitters is different.

Optionally, the movement requirements transmitted to the transmitter/receiver array by the host computer are updated in real time.

In the positioning guidance method based on guide rails provided by the present invention, the positioning guidance is realized by comparing the projection of the guide rail band with the transmitter/receiver array positioning reference and communicating the beacons, the transmitter/receiver device is simple, and the adaptability to a complicated environment is high. The beneficial effects of the present invention are as follows: the hardware construction is simple, and the complicated hardware equipment and complicated algorithms of the guide rails and the beacons, the deployment difficulty of the guide rails, and the complicated hardware equipment of the transmitter/receiver device are avoided; the present invention inherits the advantages of the existing guide rail positioning guidance methods but avoids their advantages, so that the present invention has a good practicability, a low system cost and a promising application prospect and is suitable for various indoor and outdoor scenarios. The positioning guidance method based on guide rails provided by the present invention is particularly suitable for autonomous navigation apparatuses having a relatively fixed movement path.

BRIEF DESCRIPTION OF FIGURES

To describe the specific implementations of the present invention or the technical solutions in the prior art more clearly, accompanying drawings to be used in the specific implementations or in the prior art will be briefly described below. In the accompanying drawings, similar elements or parts are generally marked with a similar reference numeral. In the accompanying drawings, each element or part is not necessarily drawn to actual scale.

DETAILED DESCRIPTION OF THE EMBODIMENTS

Figure 1:
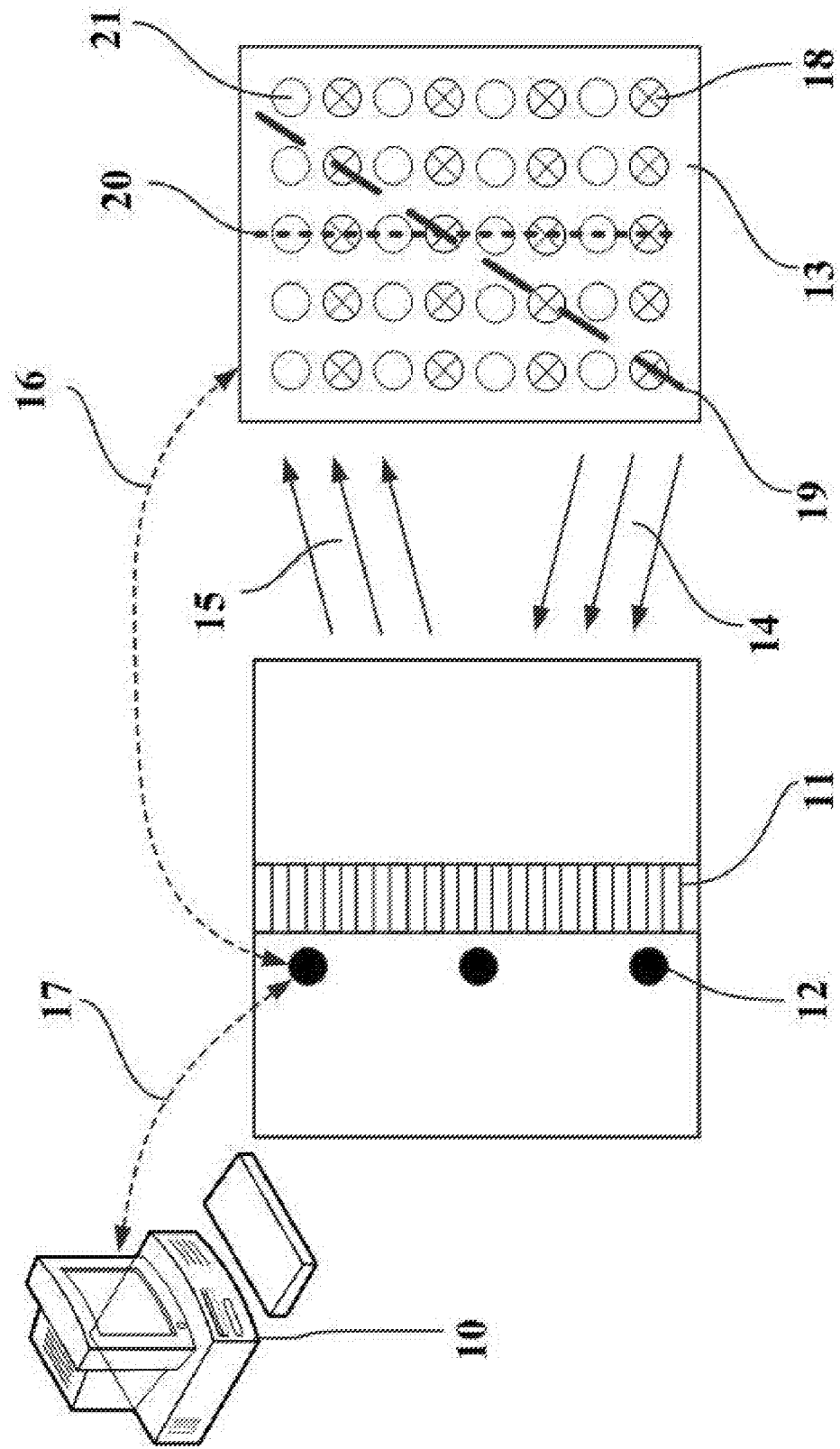
FIG. 1 is a block diagram of a positioning guidance system based on guide rails when a guide rail band reflects a positioning guidance signal.

Embodiments of the technical solutions of the present invention will be described below in details with reference to the accompanying drawings. The following embodiments are merely for more clearly describing the technical solutions of the present invention, so these embodiments are merely exemplary and not intended to limit the protection scope of the present invention.

It is to be noted that, unless otherwise stated, the technical terms or scientific terms used herein shall be general meanings understood by those skilled in the art.

A first embodiment of the present invention provides a positioning guidance system based on guide rails, including a host computer, a guide rail band, a plurality of beacons arranged along the guide rail band, and a receiver array or a transmitter/receiver array fixedly mounted on a target to be positioned and guided;

the host computer is in communication connection to the guide rail band and the beacons, and the beacons are in wireless communication connection to the receiver array or the transmitter/receiver array;

the receiver array is formed by a plurality of receivers in an array form, and the transmitter/receiver array is formed by a plurality of transmitters and a plurality of receivers in an array form;

the host computer transmits movement requirements and a list and sequence of beacons to be passed to the receiver array or the transmitter/receiver array through the beacons;

the guide rail band is configured to transmit a positioning guidance signal to the receiver array; the receiver array is configured to determine a projection of the guide rail band on the receiver array according to the positioning guidance signal, and compare the projection with a receiver array positioning reference of the receiver array and then determine a relative position of the target to be positioned and guided by taking the guide rail band as reference according to a result of the comparison; and, the receiver array is further configured to compare beacons that have been passed actually by the target to be positioned and guided and their sequence with the list and sequence of beacons to be passed, and then determine a relative movement direction of the target to be positioned and guided by taking the beacons as reference according to a result of the comparison;

or, the transmitters/receivers are configured to transmit positioning guidance signals to the guide rail band; the guide rail band is configured to reflect the positioning guidance signals transmitted by the transmitters/receivers to the reflection receivers; the reflection receivers are further configured to determine a projection of the guide rail band on the transmitter/receiver array according to the reflected positioning guidance signals, and compare the projection with a transmitter/receiver array positioning reference of the transmitter/receiver array and then determine relative positions of the transmitters/receivers by taking the guide rail band as reference according to a result of the comparison; and, the transmitter/receiver array is further configured to compare beacons that have been passed actually of the target to be positioned and guided and their sequence with the list and sequence of beacons to be passed, and determine a relative movement direction of the target to be positioned and guided by taking the beacons as reference according to a result of the comparison.

Wherein, in a specific embodiment of the present invention, the positioning guidance system based on guide rails includes a receiver array; and the positioning guidance signal transmitted by the guide rail band is an optical wave, an electromagnetic wave or an ultrasonic wave.

In a specific embodiment of the present invention, the positioning guidance system based on guide rails includes a transmitter/receiver array; and the positioning guidance signals transmitted by the transmitter/receiver array are optical waves, electromagnetic waves or ultrasonic waves.

Wherein, the positioning guidance signals transmitted by the guide rail band and/or the transmitter/receiver array are modulated signals.

It is to be noted that, the target to be positioned and guided may be moved along the guide rail band in a single direction or in both directions. In different cases, the signals transmitted to the receiver array or the transmitter/receiver array by the host computer through the beacons may be different. For example, when the target to be positioned and guided is moved along the guide rail band in a single direction, the movement requirements and the list and sequence of beacons to the passed transmitted to the receiver array or the transmitter/receiver array by the host computer specifically include: an identification number of a beacon, an identification number of a next beacon, a distance of the next beacon, a stop allowance of the next beacon, an angle of turn and a maximum permissible speed.

When the target to be positioned and guided is moved along the guide rail band in both directions, the movement requirements and the list and sequence of beacons to the passed transmitted to the receiver array or the transmitter/receiver array by the host computer specifically include: an identification number of a beacon, an identification number of a previous beacon, a distance of the previous beacon, a stop allowance of the previous beacon, an identification number of a next beacon, a distance of the next beacon, a stop allowance of the next beacon, an angle of uplink turn, an angle of downlink turn, a maximum uplink permissible speed and a maximum downlink permissible speed, wherein the uplink refers to the sequence of beacons that have been passed actually is the same as the set sequence of beacons to be passed, while the downlink has a reverse sequence.

The positioning guidance system based on guide rails provided by the first embodiment of the present invention has the following advantages: compared with the electromagnetic guide rail mode and the metal guide rail mode, the guide rail band in the present invention is easy to lay, the guide rail path is easy to be altered and expanded and the environmental adaptability is high; compared with the visual navigation mode, the positioning guidance in the present invention are ensured by both the guide rail band and the beacons, the host computer may change the path of the target to be positioned and guided in real time, the expansibility is relatively high, and the positioning guidance can also be operated normally even if a part of the guide rail band or the beacons is damaged. The positioning guidance system based on guide rails provided by the present invention is particularly suitable for autonomous navigation apparatuses having a relatively fixed movement path.

It may be easily understood that, two solutions are included in the first embodiment, where one solution is transmitting the positioning guidance signals by the guide rail band, while another solution is transmitting the positioning guidance signals by the transmitters/receivers and reflecting the positioning guidance signals by the guide rail band, and, the both solutions are based on a same invention concept, but have slightly different specific implementation means. The two solutions will be exemplarily described below with reference to the accompanying drawings.

Figure 2:
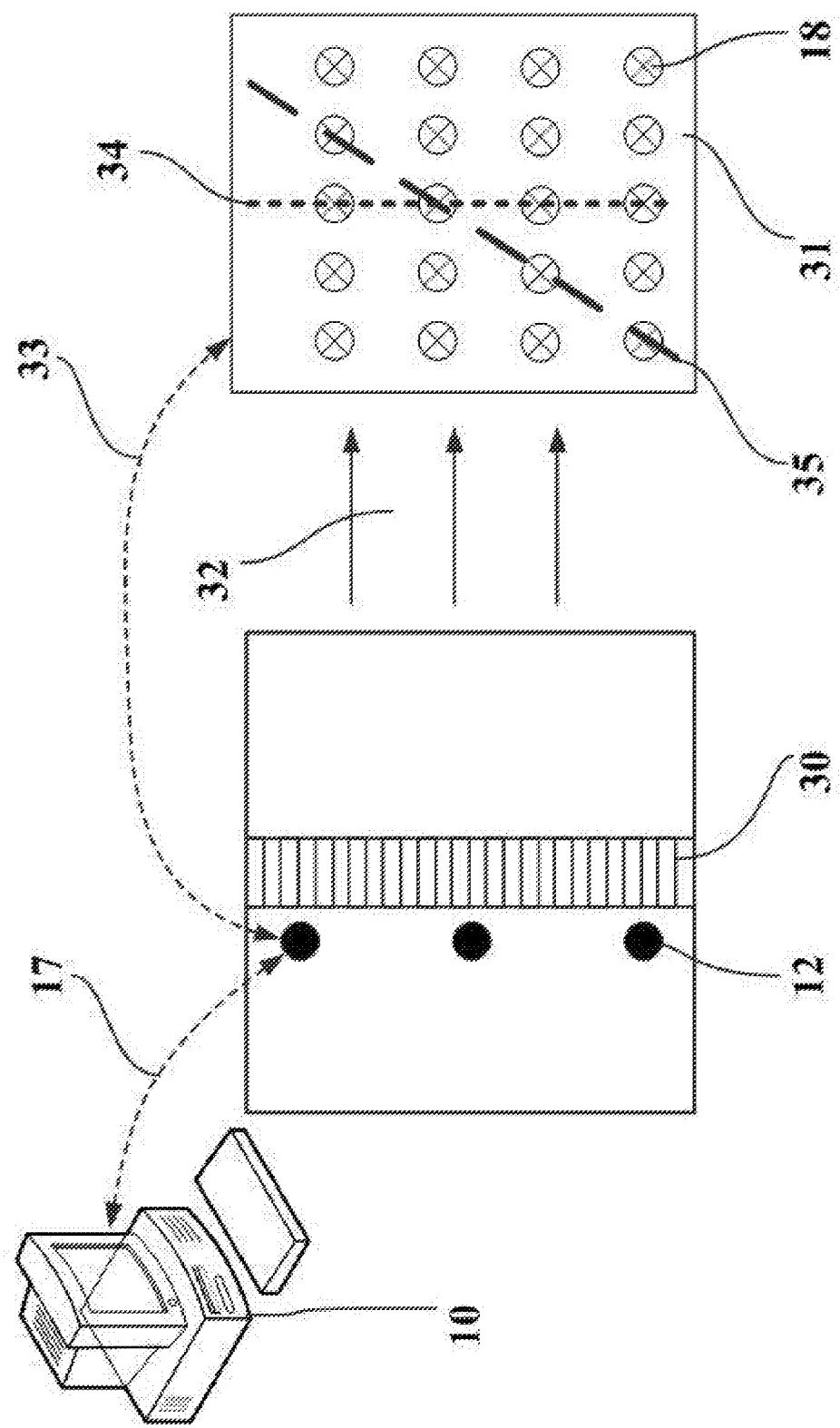
FIG. 2 is a block diagram of a positioning guidance system based on guide rails when the guide rail band transmits a positioning guidance signal.

As shown in FIG. 1, FIG. 1 is a block diagram of the positioning guidance system based on guide rails when the guide rail band reflects positioning guidance signals. In FIG. 1, by comparing the identification number of a beacon 12 currently receiving information in the transmitter/receiver array 13 with the identification number of a target beacon, the host computer 10 provides an initial direction and an initial speed of the transmitter/receiver array in a halted state and a list of identification numbers of beacons in a specified path; and, in the movement process of the receiver array, the movement requirements (including the direction, speed and stop position) for the transmitter/receiver array are updated in real time through the communication 17 between the host computer and the beacons and the communication 16 between the transmitter/receiver array and the beacons, and the state of the transmitter/receiver array and the passing path information are simultaneously acquired in real time through the communication between the receiver array and the beacons. A plurality of transmitters 21 and a plurality of receivers 18 form the transmitter/receiver array. The transmitter/receiver array is fixed on a target to be positioned and guided, and its positioning reference 20 has a certain geometrical relationship with a positioning reference of the target to be positioned and guided. Positioning guidance signals 14 transmitted by the transmitter/receiver array are optional signals or electromagnetic waves or ultrasonic waves. The reflectivity of the guide rail band 11 to the positioning guidance signals is significantly different from the reflectivity of a surrounding environment of the guide rail band to the positioning guidance signals. The signals 15 reflected by the guide rail band 15 are received by the receivers in the transmitter/receiver array. The intensity of signals received by the receivers at different positions is inconsistent, so a projection 19 of the guide rail band on the transmitter/receiver array is formed. The transmitter/receiver array compares the projection with its own positioning reference to acquire a relative position of the transmitter/receiver array by taking the guide rail band as reference. As shown in FIG. 2, FIG. 2 is a block diagram of the positioning guidance system based on guide rails when the guide rail band transmits positioning guidance signals. In FIG. 2, by comparing the identification number of a beacon 12 currently receiving information in the transmitter/receiver array 31 with the identification number of a target beacon, the host computer 10 provides an initial direction and an initial speed of the receiver array in a halted state and a list of identification numbers of beacons in a specified path; and, in the movement process of the receiver array, the movement requirements (including the direction, speed and stop position) for the receiver array are updated in real time through the communication 17 between the host computer and the beacons and the communication 33 between the receiver array and the beacons, and the state of the receiver array and the passing path information are simultaneously acquired in real time through the communication between the receiver array and the beacons. The positioning guidance signals 32 transmitted by the guide rail band 30 are optional signals or electromagnetic waves or ultrasonic waves. A plurality of receivers 18 forms the receiver array. The receiver array is fixed on a target to be positioned and guided, and its positioning reference 34 has a certain geometrical relationship with a positioning reference of the target to be positioned and guided. The intensity of signals received by the receivers at different positions is inconsistent, so a projection 35 of the guide rail band on the receiver array is formed. The receiver array compares the projection with its own positioning reference to acquire a relative position of the receiver array by taking the guide rail band as reference.

The first embodiment of the present invention may be implemented in the following alteration modes.

Beacons are mounted on the guide rail band every predetermined distance. When the transmitter/receiver array or the receiver array is moved along the guide rail band in both directions, the beacons sent out information including a unique identification number of a beacon, a unique identification number of a previous beacon, a distance of the previous beacon, a stop allowance of the previous beacon, a unique identification number of a next beacon, a distance of the next beacon, a stop allowance of the next beacon, an angle of uplink turn, a angle of downlink turn, a maximum uplink permissible speed, and a maximum downlink permissible speed; and, when the transmitter/receiver array or the receiver array is moved along the guide rail band in a single direction, the beacons send out information including an identification number of a beacon, an identification number of a next beacon, a distance of the next beacon, a stop allowance of the next beacon, an angle of turn and a maximum permissible speed, wherein the uplink refers to the sequence of beacons that have been passed actually is the same as the set sequence of beacons to be passed, while the downlink has a reverse sequence. Expect for the information about their own identification numbers of the beacons, the contents of the information sent out by the beacons are provided by the host computer. The beacons periodically upload the information to the host computer, and there is only one target to be positioned and guided in a path between two adjacent beacons.

The transmitter/receiver array or the receiver array receives the information transmitted by the beacons to acquire the stop position, the angle of turn and the maximum permissible speed, and compares the sequence of beacons that have been passed actually and a set sequence of beacons to be passed to acquire a relative movement direction.

The transmitter/receiver array transmits the positioning guidance signals in the following two ways: a time division scanning way: the transmitters successively transmit positioning guidance signals in a set order, where the positioning guidance signals transmitted by all the transmitters are the same; and, a simultaneous scanning way: all transmitters transmit positioning guidance signals simultaneously, where the signal transmitted by each transmitter is different.

The transmitter/receiver array or the receiver array has an orientation sensor, a speed sensor and a tilt angle sensor. The transmitter/receiver array or the receiver array transmits its own identification number, an identification number of a previously passed beacon, state information of the target to be positioned and guided and passing path information to the host computer through the beacons.

The transmitter/receiver array or the receiver array inputs the relative position information, the relative movement direction information, the stop position information, the information about the angle of turn, the information about the maximum permissible speed, and information about its own orientation, speed and title angle into a drive control system of the target to be positioned and guided, to overlap the transmitter/receiver array positioning reference or the receiver array positioning reference with the projection of the guide rail band, and make the movement direction, the angle of turn, the maximum speed and the stop position meet the movement requirements of the host computer, so that the purpose of moving the target to be positioned and guided in a path and direction specified by the host computer and stopping it at a set position is realized.

A second embodiment of the present invention further provides a positioning guidance method based on guide rails, including the following steps of:

transmitting, by a host computer through beacons, movement requirements and a list and sequence of beacons to be passed to a receiver array or a transmitter/receiver array fixedly mounted on a target to be positioned and guided; transmitting, by a guide rail band, positioning guidance signals to the receiver array; or, transmitting, by the transmitter/receiver array, positioning guidance signals to the guide rail band, and reflecting, by the guide rail band, the positioning guidance signals transmitted by the transmitter/receiver array to the transmitter/receiver array;

determining a projection of the guide rail band on the receiver array or the transmitter/receiver array according to differences in intensity between the signals received by receivers at different positions, after the receiver array or the transmitter/receiver array has received the positioning guidance signals;

comparing, by the receiver array, the projection with a receiver array positioning reference of the receiver array, and determining a relative position of the target to be positioned and guided by taking the guide rail band as reference according to a result of the comparison; or, comparing, by the transmitter/receiver array, the projection with a transmitter/receiver array positioning reference of the transmitter/receiver array, and determining relative positions of the transmitters/receivers by taking the guide rail band as reference according to a result of the comparison;

comparing, by the receiver array or the transmitter/receiver array, beacons that have been passed actually by the target to be positioned and guided and their sequence with the list and sequence of beacons to be passed, and determining a relative movement direction of the target to be positioned and guided by taking the beacons as reference according to a result of the comparison; and inputting, by the receiver array or the transmitter/receiver array, the relative position, the relative movement direction and the movement requirements into a drive control system of the target to be positioned and guided, to drive the target to be positioned and guided to move according to the relative position, the relative movement direction and the movement requirements through the drive control system, so as to overlap the receiver array positioning reference or the transmitter/receiver array positioning reference with the projection and make a movement direction, an angle of turn, a maximum speed and a stop position of the target to be positioned and guided meet the movement requirements transmitted by the host computer, so that the purpose of moving the target to be positioned and guided in a path and direction specified by the host computer and stopping it at a set position is realized.

In an embodiment of the present invention, the movement requirements include: a stop position, an angle of turn, a maximum permissible speed, its own orientation, a speed and a tilt angle of the target to be positioned and guided, required by the host computer.

In an embodiment of the present invention, the positioning guidance method based on guide rails further includes the following steps of:

uploading, by the receiver array or the transmitter/receiver array, its own identification number, an identification number of the previously passed beacon, state information of the target to be positioned and guided and passing path information; and determining, by the host computer, a current position, a state and passing path information of the target to be positioned and guided according to the own identification number, the identification number of the previously passed beacon, the state information of the target to be positioned and guided and the passing path information.

In an embodiment of the present invention, there is only one target to be positioned and guided in a path between two adjacent beacons.

In an embodiment of the present invention, all transmitters in the transmitter/receiver array transmit the same positioning guidance signals in a set sequence.

In an embodiment of the present invention, all transmitters in the transmitter/receiver array transmit positioning guidance signals simultaneously, and the signal transmitted by each of the transmitters is different.

In an embodiment of the present invention, the movement requirements transmitted to the transmitter/receiver array by the host computer are updated in real time.

In an embodiment of the present invention, the positioning guidance signal transmitted by the guide rail band is an optical wave, an electromagnetic wave or an ultrasonic wave.

In an embodiment of the present invention, the positioning guidance signals transmitted by the transmitter/receiver array are optical waves, electromagnetic waves or ultrasonic waves.

In the positioning guidance system and method based on guide rails provided by the present invention, the positioning guidance is realized by comparing the projection of the guide rail band with the receiver array positioning reference and communicating the beacons, the transmitter/receiver device is simple, and the adaptability to a complicated environment is high. The beneficial effects of the present invention are as follows: the hardware construction is simple, and the complicated hardware equipment and complicated algorithms of the guide rails and the beacons, the deployment difficulty of the guide rails, and the complicated hardware equipment of the transmitter/receiver device are avoided; the present invention inherits the advantages of the existing guide rail positioning guidance methods but avoids their advantages, so that the present invention has a good practicability, a low system cost and a promising application prospect and is suitable for various indoor and outdoor scenarios. The positioning guidance method based on guide rails provided by the present invention is particularly suitable for autonomous navigation apparatuses having a relatively fixed movement path.

It may be easily understood that, two solutions are included in the second embodiment, where one solution is transmitting the positioning guidance signals by the guide rail band, while another solution is transmitting the positioning guidance signals by the transmitters/receivers and reflecting the positioning guidance signals by the guide rail band, and, the both solutions are based on a same invention concept, but have slightly different specific implementation means. The two solutions will be exemplarily described below with reference to the accompanying drawings.

Figure 3:
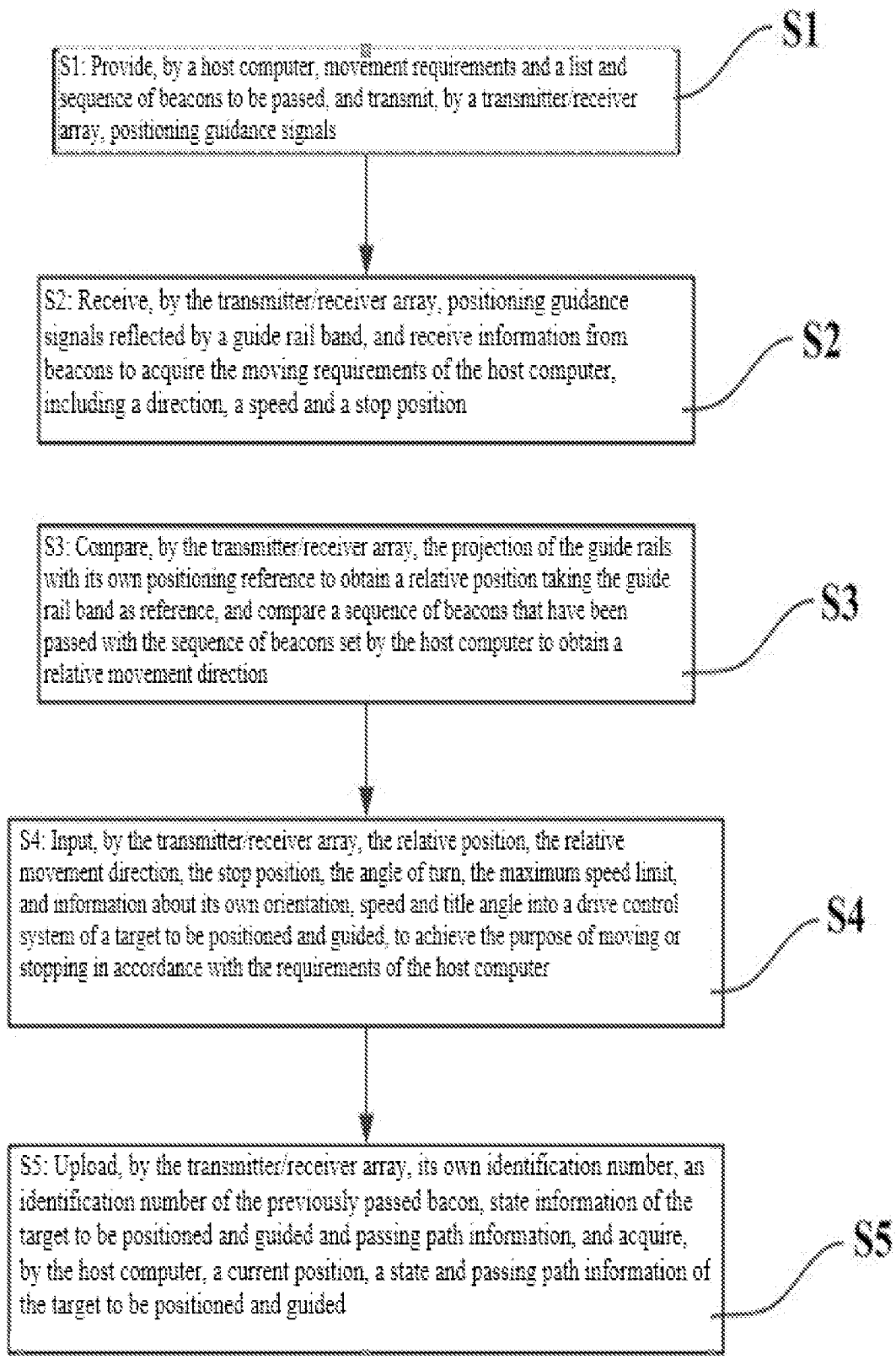
FIG. 3 is a block diagram of a positioning guidance method based on guide rails when a guide rail band reflects a positioning guidance signal.

As shown in FIG. 3, the positioning guidance method based on guide rails provided by the present invention includes the following steps in a case where the guide rail band reflects positioning guidance signals:

S1: providing, by a host computer, movement requirements and a list and sequence of beacons to be passed to a transmitter/receiver array, and transmitting, by the transmitter/receiver array, positioning guidance signals; S2: receiving, by the transmitter/receiver array, positioning guidance signals reflected by a guide rail band to form a projection of the guide rail band on the transmitter/receiver array, and receiving, by beacons, information from the host computer to acquire the moving requirements of the host computer, including a direction, a speed and a stop position;

S3: comparing, by the transmitter/receiver array, the projection of the guide rails with its own positioning reference to obtain a relative position taking the guide rail band as reference, and comparing a sequence of beacons that have been passed with the sequence of beacons set by the host computer to obtain a relative movement direction;

S4: inputting, by the transmitter/receiver array, the relative position information, the relative movement direction information, the stop position information, the information about the angle of turn, the information about the maximum permissible speed, and information about its own orientation, speed and title angle into a drive control system of the target to be positioned and guided, to overlap the transmitter/receiver array positioning reference with the projection of the guide rail band, and make the movement direction, the angle of turn, the maximum speed and the stop position meet the movement requirements of the host computer, so that the purpose of moving the target to be positioned and guided in a path and direction specified by the host computer and stopping it at a set position is realized; and S5: uploading, by the transmitter/receiver array, its own identification number, an identification number of the previously passed bacon, state information of the target to be positioned and guided and passing path information, and acquiring, by the host computer, a current position, a state and passing path information of the target to be positioned and guided.

Figure 4:
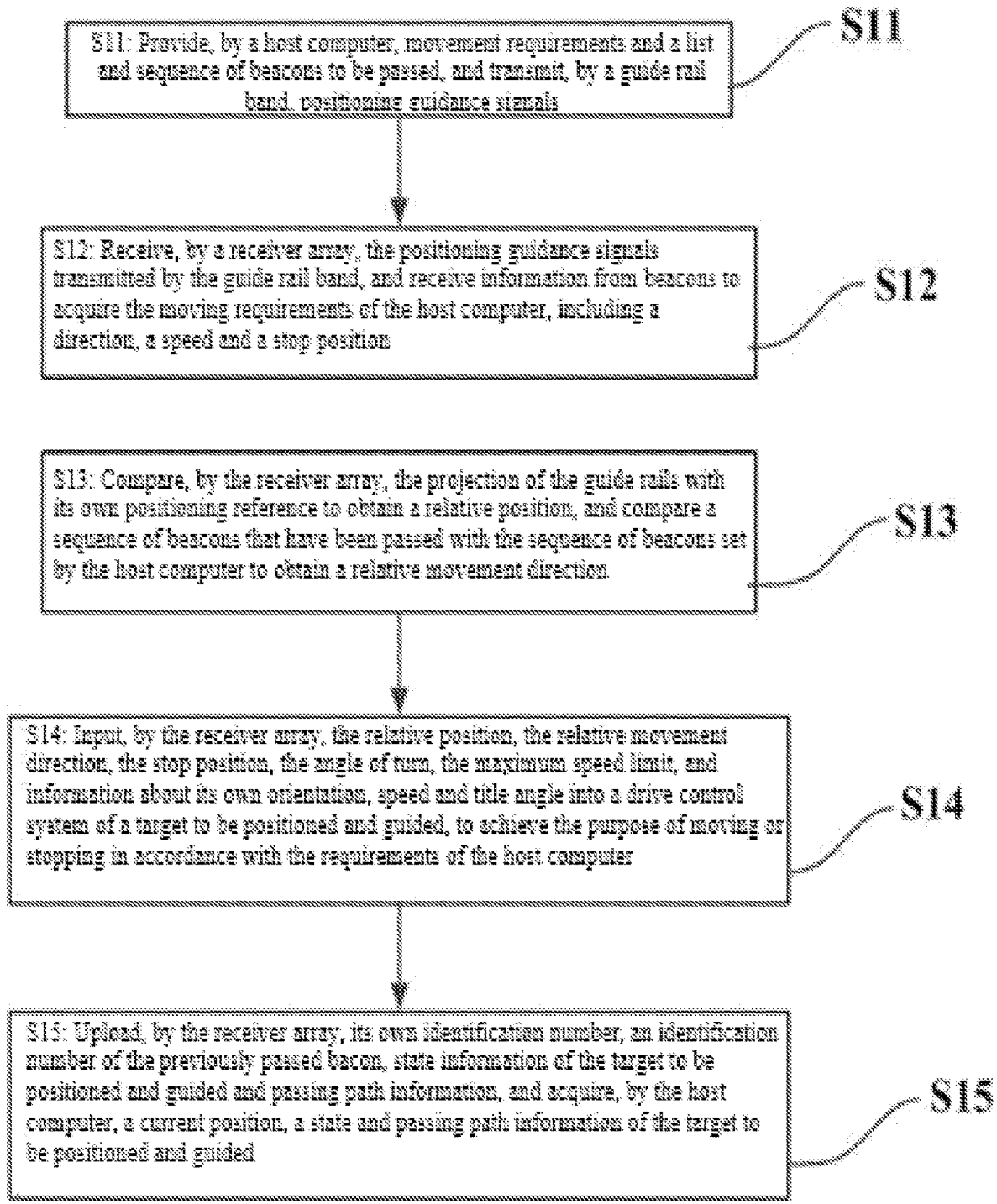
FIG. 4 is a block diagram of a positioning guidance method based on guide rails when a guide rail band transmits a positioning guidance signal, in which: 10: host computer; 11: a guide rail band for reflecting a positioning guidance signal; 12: beacons; 13: transmitter/receiver array; 14: positioning guidance signals transmitted by the transmitter/receiver array; 15: positioning guidance signals reflected by the guide rail band; 16: communication between the transmitter/receiver array and the beacons; 17: communication between the host computer and the beacons; 18: receivers; 19: projection of the guide rail band on the transmitter/receiver array; 20: transmitter/receiver array positioning reference; 21: transmitters; 30: guide rail band for transmitting a positioning guidance signal; 31: receiver array; 32: positioning guidance signal transmitted by the guide rail band; 33: communication between the receiver array and the beacons; 34: receiver array positioning reference; and, 35: projection of the guide rail band on the receiver array.

As shown in FIG. 4, the positioning guidance method based on guide rails provided by the present invention includes the following steps in a case where the guide rail band transmits positioning guidance signals:

S11: providing, by a host computer, movement requirements and a list and sequence of beacons to be passed to a receiver array, and transmitting, by a guide rail band, positioning guidance signals;

S12: receiving, by a receiver array, the positioning guidance signals transmitted by a guide rail band to form a projection of the guide rail band on the receiver array, and receiving, by beacons, information from the host computer to acquire the moving requirements of the host computer, including a direction, a speed and a stop position;

S13: comparing, by the receiver array, the projection of the guide rails with its own positioning reference to obtain a relative position taking the guide rail band as reference, and comparing a sequence of beacons that have been passed with the sequence of beacons set by the host computer to obtain a relative movement direction;

S14: inputting, by the receiver array, the relative position information, the relative movement direction information, the stop position information, the information about the angle of turn, the information about the maximum permissible speed, and information about its own orientation, speed and title angle into a drive control system of the target to be positioned and guided, to overlap the receiver array positioning reference with the projection of the guide rail band, and make the movement direction, the angle of turn, the maximum speed and the stop position meet the movement requirements of the host computer, so that the purpose of moving the target to be positioned and guided in a path and direction specified by the host computer and stopping it at a set position is realized; and S15: uploading, by the receiver array, its own identification number, an identification number of the previously passed bacon, state information of the target to be positioned and guided and passing path information, and acquiring, by the host computer, a current position, a state and passing path information of the target to be positioned and guided.

It is to be noted that, unless otherwise stated, the technical terms or scientific terms used herein shall be general meanings understood by those skilled in the art.

In the description of the present application, the terms "first", "second" and the like are merely for illustrative purpose, and cannot be interpreted as indicating or implying the relative importance or implicitly indicating the number of the specified technical feature. In the description of the present invention, "a plurality of" means more than two, unless otherwise specifically defined.

In the present application, unless otherwise expressly specified and defined, terms "mounted", "connected with", "connected to", "fixed" and the like shall be interpreted in a broad sense, for example, it may be fixedly connected, or may be detachably connected or formed integrally; or, it may be mechanically connected or electrically connected; or, it may be directly connected, or indirectly connected via an intermediate medium; or, it may be an internal communication of two elements or an interaction relationship of two elements. A person of ordinary skill in the art may understand the specific meanings of the terms in the present invention according to specific conditions.

In the present application, unless otherwise expressly specified and defined, if a first feature is located "above" or "below" a second feature, the first feature may be in direct contact with the second feature, or the first feature is in indirect contact with the second feature via an intermediate medium. Moreover, the first feature being "above", "over" or "on" the second feature may mean that the first feature is rightly above or obliquely above the second feature, or the horizontal height of the first feature is merely higher than that of the second feature. The first feature being "under", "below" or "underneath" the second feature may mean that the first feature is rightly below or obliquely below the second feature, or the horizontal height of the first feature is merely less than that of the second feature.

In the specification of the present invention, lots of specific details are described. However, it should be understood that the embodiments of the present invention may be practiced without these specific details. In some instances, the known methods, structures and techniques are not described in details, for not blurring the understanding of the present specification.

In the description of the present specification, reference terms "an embodiment", "some embodiments", "an example", "a specific example", "some examples" and the like mean that a specific feature, structure, material or characteristic described in conjunction with this embodiment or example is included in at least one embodiment or example of the present invention. In the present specification, the schematic expressions of these terms are not necessarily specific to a same embodiment or example. Moreover, the described specific feature, structure, material or characteristic may be combined appropriately in any one or more embodiments or examples. In addition, without contradictories, those skilled in the art may integrate and combine different embodiments or examples described in the present specification and the features of the different embodiments or examples.

Finally, it is to be pointed out that, the foregoing embodiments are merely for describing the technical solutions of the present invention and not intended to limit the same. Although the present invention has been described in details by the foregoing embodiments, it should be understood by a person of ordinary skill in the art that modifications may be made to the technical solutions recorded in the foregoing embodiments, or equivalent replacements may be made to a part or all of the technical features, and these modifications or replacements shall fall into the scope of the claims and specification of the present invention since the essence of the corresponding technical features is not departed from the scope of the technical solutions of the embodiments of the present invention.

What is claimed is:

1. A positioning guidance system based on guide rails, comprising:
    a host computer;
    a guide rail band;
    a plurality of beacons arranged along the guide rail band; and
    a receiver array fixedly mounted on a target to be positioned and guided, wherein:
    the host computer is in communication connection to the guide rail band and the beacons;
    the beacons are in wireless communication connection to the receiver array;
    the receiver array is formed by a plurality of receivers in an array form;
    the host computer transmits movement requirements and a list and sequence of beacons to be passed to the receiver array through the beacons;
    the guide rail band is configured to transmit a positioning guidance signal to the receiver array;
    the receiver array is configured to determine a projection of the guide rail band on the receiver array according to the positioning guidance signal, and compare the projection with a receiver array positioning reference of the receiver array and then determine a relative position of the target to be positioned and guided by taking the guide rail band as reference according to a result of the comparison; and
    the receiver array is further configured to compare beacons that have been passed actually by the target to be positioned and guided and their sequence with the list and sequence of beacons to be passed, and then determine a relative movement direction of the target to be positioned and guided by taking the beacons as reference according to a result of the comparison.

2. The positioning guidance system based on guide rails according to claim 1, wherein the positioning guidance signal transmitted by the guide rail band is one of optical wave, electromagnetic wave and ultrasonic wave.

3. The positioning guidance system based on guide rails according to claim 1, wherein the positioning guidance signal transmitted by the guide rail band is a modulated signal.

4. The positioning guidance system based on guide rails according to claim 1, wherein:
    when the target to be positioned and guided is moved along the guide rail band in a single direction, the movement requirements and the list and sequence of beacons to the passed transmitted to the receiver array by the host computer specifically comprise: an identification number of a beacon; an identification number of a next beacon; a distance of the next beacon; a stop allowance of the next beacon; and an angle of turn and a maximum permissible speed; and
    when the target to be positioned and guided is moved along the guide rail band in both directions, the movement requirements and the list and sequence of beacons to the passed transmitted to the receiver array by the host computer specifically comprise: an identification number of a beacon; an identification number of a previous beacon; a distance of the previous beacon; a stop allowance of the previous beacon; an identification number of a next beacon; a distance of the next beacon; a stop allowance of the next beacon;
    an angle of uplink turn; an angle of downlink turn; and a maximum uplink permissible speed and a maximum downlink permissible speed, the uplink being the situation where the sequence of beacons that have been passed actually is the same as the set sequence of beacons to be passed and the downlink having a reverse sequence.

5. A positioning guidance system based on guide rails, comprising:
    a host computer;
    a guide rail band;
    a plurality of beacons arranged along the guide rail band; and
    a transmitter/receiver array fixedly mounted on a target to be positioned and guided, wherein:
    the host computer is in communication connection to the guide rail band and the beacons;
    the beacons are in wireless communication connection to the transmitter/receiver array;
    the transmitter/receiver array is formed by a plurality of transmitters and a plurality of receivers in an array form;
    the host computer transmits movement requirements and a list and sequence of beacons to be passed to the transmitter/receiver array through the beacons;
    the transmitters of the transmitter/receiver array are configured to transmit positioning guidance signals to the guide rail band;

the guide rail band is configured to reflect the positioning guidance signals to the receivers of the transmitter/receiver array;

the receivers of the transmitter/receiver array are further configured to determine a projection of the guide rail band on the transmitter/receiver array according to the reflected positioning guidance signals, and compare the projection with a transmitter/receiver array positioning reference of the transmitter/receiver array and then determine relative positions of the transmitters/receivers by taking the guide rail band as reference according to a result of the comparison; and the transmitter/receiver array is further configured to compare beacons that have been passed actually by the target to be positioned and guided and their sequence with the list and sequence of beacons to be passed, and determine a relative movement direction of the target to be positioned and guided by taking the beacons as reference according to a result of the comparison.

6. The positioning guidance system based on guide rails according to claim 5, wherein the positioning guidance signals transmitted by the transmitter/receiver array are one of optical waves, electromagnetic waves and ultrasonic waves.

7. The positioning guidance system based on guide rails according to claim 5, wherein the positioning guidance signals transmitted by the transmitter/receiver array are modulated signal.

8. The positioning guidance system based on guide rails according to claim 5, wherein: when the target to be positioned and guided is moved in a single direction, the movement requirements and the list and sequence of beacons to the passed transmitted to the transmitter/receiver array by the host computer specifically comprise: an identification number of a beacon; an identification number of the next beacon; a distance; a stop allowance; an angle of turn and a maximum permissible speed; and when the target to be positioned and guided is moved along the guide rail band in both directions, the movement requirements and the list and sequence of beacons to the passed transmitted to the transmitter/receiver array by the host computer specifically comprise: an identification number of a beacon; an identification number of a previous beacon; a distance of the previous beacon; a stop allowance of the previous beacon; an identification number of a next beacon; a distance of the next beacon; a stop allowance of the next beacon; an angle of uplink turn; an angle of downlink turn; and a maximum uplink permissible speed and a maximum downlink permissible speed, the uplink being the situation where the sequence of beacons that have been passed actually is the same as the set sequence of beacons to be passed and the downlink having a reverse sequence.

9. A positioning guidance method based on guide rails, comprising the following steps of:

transmitting, by a host computer through beacons, movement requirements and a list and sequence of beacons to be passed to a receiver array fixedly mounted on a target to be positioned and guided;

transmitting, by a guide rail band, a positioning guidance signal to the receiver array;

determining a projection of the guide rail band on the receiver array according to differences in intensity between the signals received by receivers at different positions, after the receiver array has received the positioning guidance signal;

comparing, by the receiver array, the projection with a receiver array positioning reference of the receiver array, and determining a relative position of the target to be positioned and guided by taking the guide rail band as reference according to a result of the comparison;

comparing, by the receiver array, beacons that have been passed actually by the target to be positioned and guided and their sequence with the list and sequence of beacons to be passed, and determining a relative movement direction of the target to be positioned and guided by taking the beacons as reference according to a result of the comparison; and inputting, by the receiver array, the relative position, the relative movement direction and the movement requirements into a drive control system of the target to be positioned and guided, to drive the target to be positioned and guided to move according to the relative position, the relative movement direction and the movement requirements through the drive control system, so as to overlap the receiver array positioning reference with the projection and make a movement direction, an angle of turn, a maximum speed and a stop position of the target to be positioned and guided meet the movement requirements transmitted by the host computer, so that the purpose of moving the target to be positioned and guided in a path and direction specified by the host computer and stopping it at a set position is realized.

10. The positioning guidance method based on guide rails according to claim 9, wherein the movement requirements comprise, as required by the host computer: a stop position; an angle of turn; a maximum permissible speed; its own orientation; and a speed and a tilt angle of the target to be positioned and guided.

11. The positioning guidance method based on guide rails according to claim 9, further comprising the following steps of:

uploading, by the receiver array, its own identification number, an identification number of the previously passed beacon, state information of the target to be positioned and guided and passing path information to the host computer through the beacons; and determining, by the host computer, a current position, a state and passing path information of the target to be positioned and guided according to the own identification number, the identification number of the previously passed beacon, the state information of the target to be positioned and guided and the passing path information.

12. The positioning guidance method based on guide rails according to claim 9, wherein there is only one target to be positioned and guided in a path between two adjacent beacons.

13. The positioning guidance method based on guide rails according to claim 9, wherein the movement requirements transmitted to the receiver array by the host computer are updated in real time.

14. A positioning guidance method based on guide rails, comprising the following steps of:

transmitting, by a host computer through beacons, movement requirements and a list and sequence of beacons to be passed to a transmitter/receiver array fixedly mounted on a target to be positioned and guided;

transmitting, by the transmitter/receiver array, positioning guidance signals to the guide rail band, and reflecting, by the guide rail band, the positioning guidance signals transmitted by the transmitter/receiver array to the transmitter/receiver array;

determining a projection of the guide rail band on the transmitter/receiver array according to differences in intensity between the signals received by receivers at different positions, after the transmitter/receiver array has received the positioning guidance signals;

comparing, by the transmitter/receiver array, the projection with a transmitter/receiver array positioning reference of the transmitter/receiver array, and determining relative positions of the transmitters/receivers by taking the guide rail band as reference according to a result of the comparison;

comparing, by the transmitter/receiver array, beacons that have been passed actually by the target to be positioned and guided and their sequence with the list and sequence of beacons to be passed, and determining a relative movement direction of the target to be positioned and guided by taking the beacons as reference according to a result of the comparison; and inputting, by the transmitter/receiver array, the relative position, the relative movement direction and the movement requirements into a drive control system of the target to be positioned and guided, to drive the target to be positioned and guided to move according to the relative position, the relative movement direction and the movement requirements through the drive control system, so as to overlap the transmitter/receiver array positioning reference with the projection and make a movement direction, an angle of turn, a maximum speed and a stop position of the target to be positioned and guided meet the movement requirements transmitted by the host computer, so that the purpose of moving the target to be positioned and guided in a path and direction specified by the host computer and stopping it at a set position is realized.

15. The positioning guidance method based on guide rails according to claim 14, characterized in that the movement requirements comprise: a stop position, an angle of turn, a maximum permissible speed, its own orientation, a speed and a tilt angle of the target to be positioned and guided, required by the host computer.

16. The positioning guidance method based on guide rails according to claim 14, further comprising the following steps of:

uploading, by the transmitter/receiver array, its own identification number, an identification number of the previously passed beacon, state information of the target to be positioned and guided and passing path information; and determining, by the host computer, a current position, a state and passing path information of the target to be positioned and guided according to the own identification number, the identification number of the previously passed beacon, the state information of the target to be positioned and guided and the passing path information.

17. The positioning guidance method based on guide rails according to claim 14, wherein there is only one target to be positioned and guided in a path between two adjacent beacons.

18. The positioning guidance method based on guide rails according to claim 14, wherein all transmitters in the transmitter/receiver array transmit the same positioning guidance signals in a set sequence.

19. The positioning guidance method based on guide rails according to claim 14, wherein: all transmitters in the transmitter/receiver array transmit positioning guidance signals simultaneously; and the signal transmitted by each of the transmitters is different.

20. The positioning guidance method based on guide rails according to claim 14, wherein the movement requirements transmitted to the transmitter/receiver array by the host computer are updated in real time.

\* \* \* \* \*